US012794244B2

(12) United States Patent
Xie

(10) Patent No.: US 12,794,244 B2
(45) **Date of Patent: *Nov. 10, 2026**

(54) CHARGER, DATA CABLE, AND CHARGING DEVICE

(71) Applicant: VIVO MOBILE COMMUNICATION CO., LTD., Dongguan (CN)

(72) Inventor: Yabing Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 854 days.

This patent is subject to a terminal disclaimer.

(21) Appl. No.: 18/097,131

(22) Filed: Jan. 13, 2023

(65) Prior Publication Data

US 2023/0170708 A1 Jun. 1, 2023

Related U.S. Application Data

(63) Continuation of application No. PCT/CN2021/106005, filed on Jul. 13, 2021.

(30) Foreign Application Priority Data

Jul. 14, 2020 (CN) ........................ 202010674298.X

(51) Int. Cl.
*H02J 7/00* (2026.01)
*H01R 31/06* (2006.01)
*H02J 7/40* (2026.01)

(52) U.S. Cl.
CPC .............. *H02J 7/40* (2026.01); *H01R 31/065* (2013.01)

(58) Field of Classification Search
CPC ........................................................ H02J 7/40
(Continued)

(56) References Cited

U.S. PATENT DOCUMENTS

2015/0346790 A1* 12/2015 Talmola .............. G06F 13/4068 713/300
2017/0222459 A1 8/2017 Kang
(Continued)

FOREIGN PATENT DOCUMENTS

CN 101061667 A 10/2007
CN 106415979 A 2/2017
(Continued)

OTHER PUBLICATIONS

International Search Report issued in corresponding International Application No. PCT/CN2021/106005, mailed Sep. 28, 2021, 5 pages.

(Continued)

*Primary Examiner* — Yalkew Fantu
(74) *Attorney, Agent, or Firm* — IPX PLLC

(57) ABSTRACT

A charger, a data cable, and a charging device are provided. The charger includes a first Type-A port including a data pin, a charging module, and a first PD transceiving module, wherein a first end of the charging module is connected to the data pin, a second end of the charging module is connected to a first end of the first PD transceiving module, and a second end of the first PD transceiving module is connected to the data pin; when the charger is connected to a matched first data cable, the charging module performs non-PD charging on a to-be-charged device based on a differential mode signal transmitted through the data pin, or the charging module performs PD charging on a to-be-charged device based on a common mode signal processed by the first PD transceiving module and transmitted through the data pin.

13 Claims, 4 Drawing Sheets

(58) Field of Classification Search
USPC .......................................................... 320/107
See application file for complete search history.

(56) References Cited

U.S. PATENT DOCUMENTS

| | | | | | |
|---|---|---|---|---|---|
| 2017/0256968 | A1 | 9/2017 | Yoon et al. | | |
| 2019/0346900 | A1 | 11/2019 | Hutchings et al. | | |
| 2023/0082918 | A1* | 3/2023 | Wei | H02J 7/42 | 320/108 |
| 2023/0085923 | A1* | 3/2023 | Zhang | H02J 7/42 | 320/107 |
| 2023/0096538 | A1* | 3/2023 | Luo | H02J 7/42 | 361/601 |
| 2023/0101461 | A1* | 3/2023 | Luo | H02J 7/42 | 320/107 |
| 2023/0101861 | A1* | 3/2023 | Luo | H02J 7/42 | 320/107 |
| 2023/0170709 | A1* | 6/2023 | Liu | G06F 13/4282 | 320/137 |

FOREIGN PATENT DOCUMENTS

| | | | |
|---|---|---|---|
| CN | 107706685 | A | 2/2018 |
| CN | 207410088 | U | 5/2018 |
| CN | 108233130 | A | 6/2018 |
| CN | 108270262 | A | 7/2018 |
| CN | 108599530 | A | 9/2018 |
| CN | 209184279 | U | 7/2019 |
| CN | 210327098 | U | 4/2020 |
| CN | 111817385 | A | 10/2020 |

OTHER PUBLICATIONS

First Office Action issued in related Chinese Application No. 202010674298.X, mailed Jul. 30, 2021, 7 pages.

* cited by examiner

CHARGER, DATA CABLE, AND CHARGING DEVICE

CROSS-REFERENCE TO RELATED APPLICATIONS

This application is a continuation of International Application No. PCT/CN2021/106005, filed on Jul. 13, 2021, which claims priority to Chinese Patent Application No. 202010674298.X, filed on Jul. 14, 2020. The entire contents of each of the above-identified applications are expressly incorporated herein by reference.

TECHNICAL FIELD

This application relates to the field of communications technologies, and specifically relates to a charger, a data cable, and a charging device.

BACKGROUND

With the development of science and technology, fast charging is increasingly and widely applied.

In the related art, a Power Delivery (PD) protocol is generally used for fast charging. A charger that supports PD protocol charging needs to perform communication by using a Configuration Channel (CC) signal cable. The charger that supports the PD protocol charging generally uses a Standard-C (Type-C) port and a Type-C to Type-C data cable. A data cable using a Standard-A (Type-A or Standard-A) port performs communication through a D+/D− signal cable and cannot support the PD protocol charging. Therefore, a Type-A port on a conventional data cable does not support the PD protocol charging.

SUMMARY

Embodiments of this application are intended to provide a charger, a data cable, and a charging device.

According to a first aspect, an embodiment of this application provides a charger, including a first Type-A port, a charging module, and a first PD transceiving module, where the first Type-A port includes a data pin, a first end of the charging module is connected to the data pin, a second end of the charging module is connected to a first end of the first PD transceiving module, and a second end of the first PD transceiving module is connected to the data pin;

in a case that the charger is connected to a data cable, if the data cable is a first data cable and the first PD transceiving module is in a working state, the charging module performs non-PD charging on a to-be-charged device based on a differential mode signal transmitted through the data pin, or the charging module performs PD charging on a to-be-charged device based on a common mode signal processed by the first PD transceiving module and transmitted through the data pin;

in a case that the charger is connected to the data cable, if the data cable is a second data cable, the first PD transceiving module is in a non-working state, and the charging module performs non-PD charging on a to-be-charged device based on a differential mode signal transmitted through the data pin, where when the first PD transceiving module receives a first signal transmitted through the data pin, the data cable is the first data cable; and when the first PD transceiving module does not receive the first signal transmitted through the data pin, the data cable is the second data cable, and the first data cable generates the first signal when connected to the to-be-charged device.

According to a second aspect, an embodiment of this application provides a data cable, including: a second Type-A port and a Type-C port, where the second Type-A port and the Type-C port are connected by a cable, the second Type-A port and the Type-C port each include a CC pin and a data pin, and CC pins and data pins in the second Type-A port and the Type-C port are connected in a one-to-one correspondence;

the data cable is provided with a second PD transceiving module, where a first end of the second PD transceiver module is connected to the CC pin, and a second end of the second PD transceiving module is connected to the data pin;

in a case that the data cable is connected to a charger, if the charger is a first charger and the second PD transceiving module is in a working state, the second PD transceiving module is configured to perform mutual conversion on a common mode signal transmitted through the data pin and a PD charging signal transmitted through the CC pin, so as to perform PD charging on a to-be-charged device, or the data cable and the first charger perform non-PD charging on the to-be-charged device based on a differential signal transmitted through the data pin;

in a case that the data cable is connected to a charger, if the charger is a second charger and the second PD transceiving module is in a non-working state, the data cable and the second charger perform non-PD charging on a to-be-charged device based on a differential signal transmitted through the data pin, where when the second PD transceiving module receives a second signal transmitted through the data pin, the charger is the first charger; and when the second PD transceiving module does not receive the second signal transmitted through the data pin, the charger is the second charger, and the data cable generates a first signal when connected to the to-be-charged device, and the first charger generates the second signal in response to the first signal.

According to a third aspect, an embodiment of this application provides a charging device, including: a charger and a data cable, where the charger is the charger according to the first aspect, the data cable is the data cable according to the second aspect, and a data pin in the first Type-A port is correspondingly connected to a data pin in the second Type-A port.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms “first,” “second,” and the like in the specification and claims of this application are used to distinguish between similar objects instead of describing a specific order or sequence. It should be understood that data used in this way may be interchangeable in an appropriate case, so that the embodiments of this application can be implemented in a sequence other than those shown or described herein, and objects distinguished by “first” and “second” are generally of a same type, and a quantity of objects is not limited. For example, there may be one or more first targets. In addition, in the specification and the claims, “and/or” represents at least one of connected objects, and a character “/” generally represents an “or” relationship between associated objects.

With reference to the accompanying drawings, the following describes in detail a charger, data cable, and charging device provided according to the embodiments of this application based on specific embodiments and application scenarios thereof.

Figure 1:
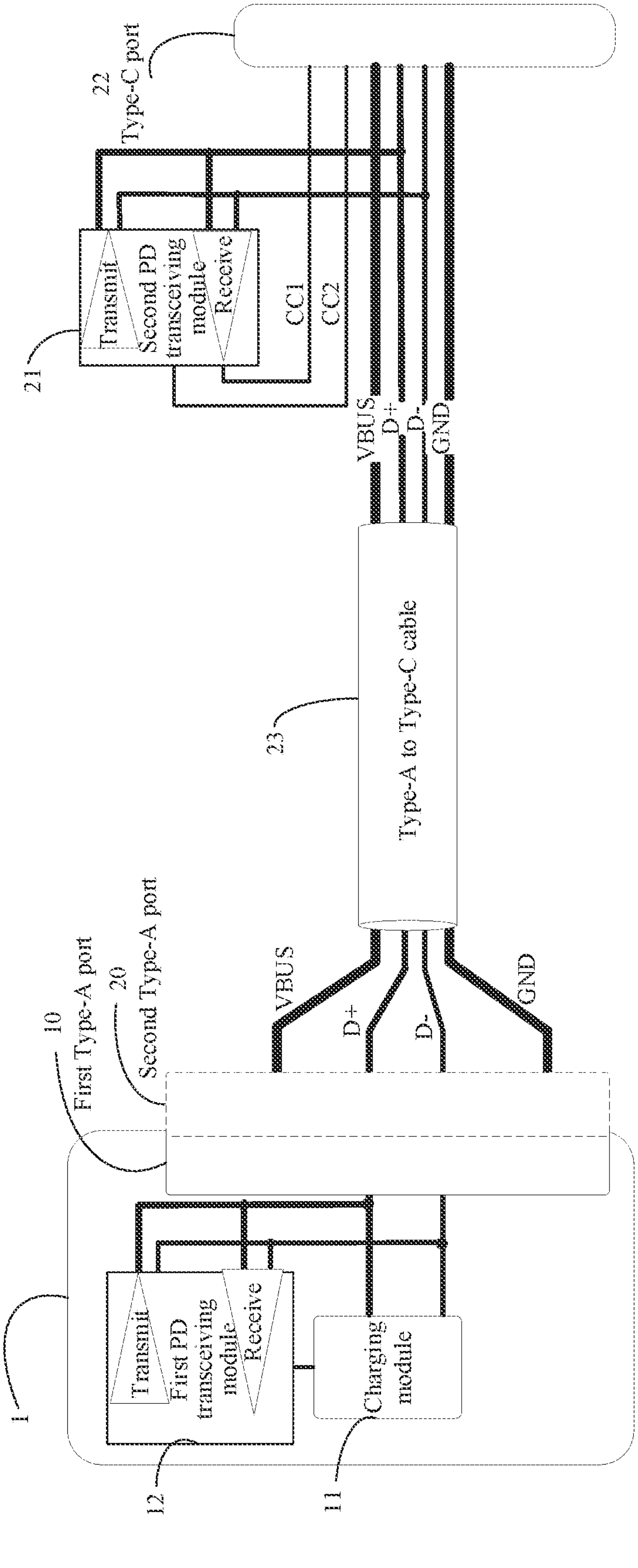
FIG. 1 is a structural diagram of a charging device according to an embodiment of this application.
Figure 2:
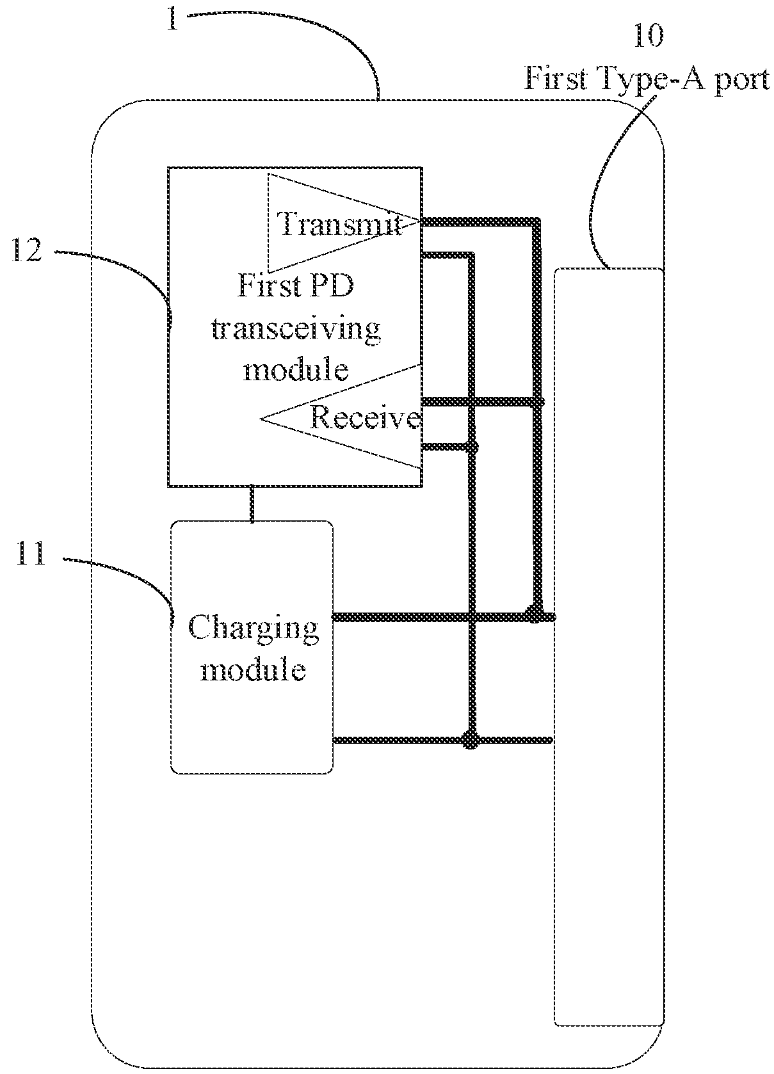
FIG. 2 is a structural diagram of a charger according to an embodiment of this application.
Figure 3:
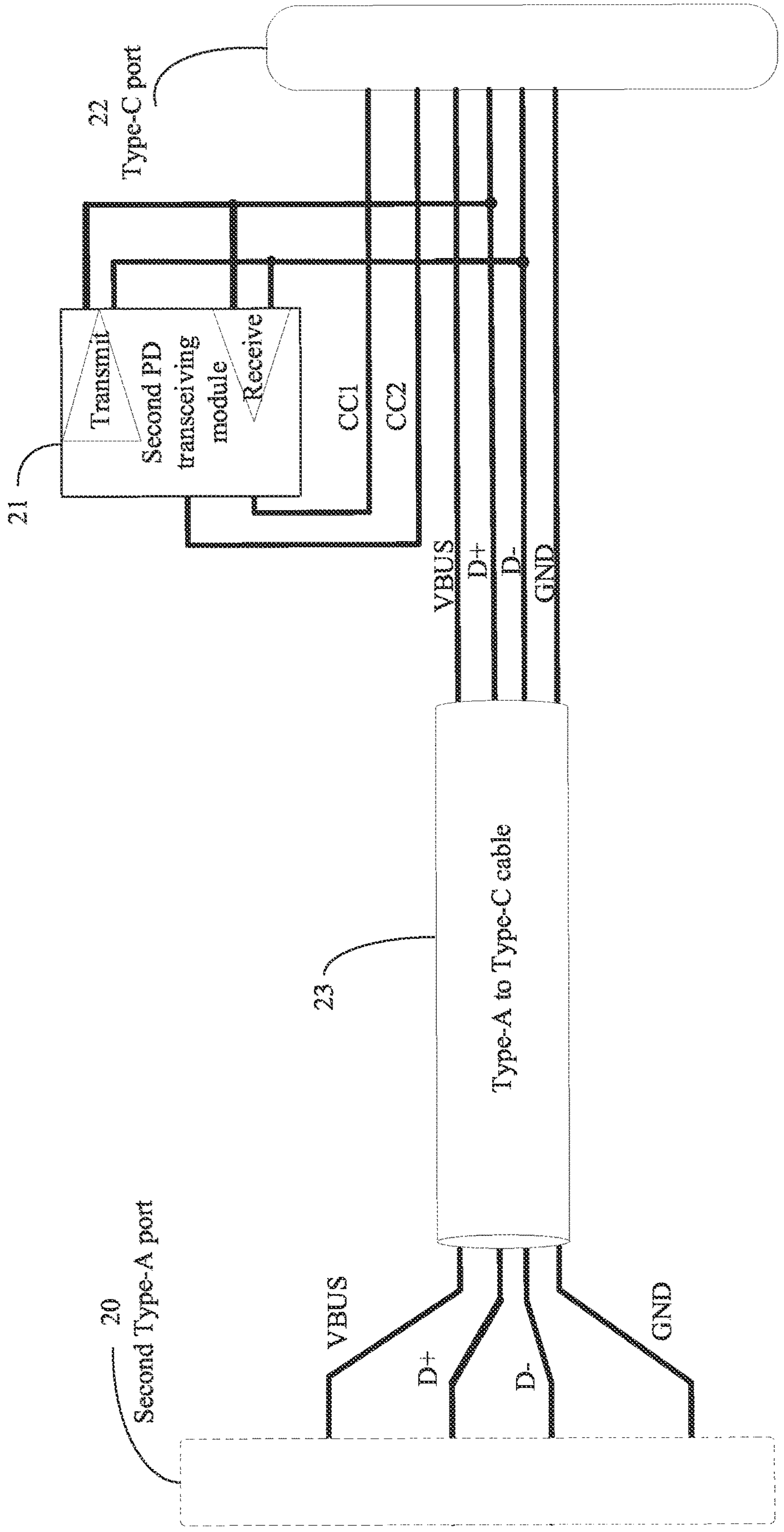
FIG. 3 is a structural diagram of a data cable according to an embodiment of this application.

Referring to both FIG. 1 and FIG. 2, FIG. 1 is a structure of a charging device according to an embodiment of this application; and FIG. 2 is a structural diagram of a charger according to an embodiment of this application, where a charger 1 includes a first Type-A port 10, and a data cable 2 is a Type-A to Type-C data cable, and a second Type-A port 20 of the data cable 2 is matched with the first Type-A port 10, and a Type-C port of the data cable 2 can be connected to a to-be-charged device.

The charger 1 includes the first Type-A port 10, a charging module 11, and a first PD transceiving module 12. The first Type-A port 10 includes a data pin, a first end of the charging module 11 is connected to the data pin, a second end of the charging module 11 is connected to a first end of the first PD transceiving module 12, and a second end of the first PD transceiving module 12 is connected to the data pin.

In a case that the charger 1 is connected to the data cable 2, if the data cable 2 is a first data cable and the first PD transceiving module 12 is in a working state, the charging module 11 performs non-PD charging on a to-be-charged device based on a differential mode signal transmitted through the data pin, or the charging module 11 performs PD charging on a to-be-charged device based on a common mode signal processed by the first PD transceiving module 12 and transmitted through the data pin.

In a case that the charger 1 is connected to the data cable 2, if the data cable 2 is a second data cable, the first PD transceiving module 12 is in a non-working state, and the charging module 11 performs non-PD charging on a to-be-charged device based on a differential mode signal transmitted through the data pin.

When the first PD transceiving module 12 receives a first signal transmitted through the data pin, the data cable 2 is the first data cable. When the first PD transceiving module 12 does not receive the first signal transmitted through the data pin, the data cable 2 is the second data cable, and the first data cable generates the first signal when connected to the to-be-charged device.

In some implementations, data pins may be data pins in a second generation of Universal Serial Bus (USB 2.0): a D+ pin (also called a positive data pin) and a D− pin (also called a negative data pin). Definitely, in some implementations, the data pins may also be data pins in a third generation of Universal Serial Bus (USB 3.0): a TX pin, an RX pin, and the like. For ease of understanding, the data pins are represented as a D+ pin and a D− pin in embodiments shown in FIG. 1 to FIG. 4, and a type of the data pins is not limited herein.

In addition, the second end of the first PD transceiving module 12 may include a receive end and a transmit end. In this case, the first PD transceiving module 12 may obtain a communication signal in the data pin through the receive end, and may also send the common mode signal to the data pin through the transmit end.

In addition, when the first PD transceiving module 12 is in the working state, the second end thereof is in communication with the data pin. In some implementations, the first end of the first PD transceiving module 12 is in communication with the second end thereof, so as to convert a PD signal received at the first end into a common mode signal and then transmit the common mode signal to the data pin at the second end, and convert the common mode signal obtained by the data pin at the second end into a PD signal and then transmit the PD signal to the charging module 11 through the first end.

In addition, when the first PD transceiving module 12 is in the non-working state, the second end thereof may be disconnected from the data pin. In some implementations, the first end of the first PD transceiving module 12 may be disconnected from the second end thereof, so as to prevent interference with a signal in the data pin.

In some implementations, at least a PD charging communication protocol is configured in the charging module 11, and the first end of the first PD transceiving module 12 is configured to transmit communication information of the communication protocol.

In the embodiments of this application, the PD transceiving module is disposed in the charger, so that mutual conversion between a PD signal and the common mode signal transmitted through the data pin may be implemented through the PD transceiving module, while no interference with the differential mode signal transmitted through the data pin is caused. Therefore, the data pin in the Type-A port may be reused to implement transmission of the PD signal, and then the charging device including the charger and the Type-A to Type-C data cable can support the PD charging.

It should be noted that, in some implementations, the charging module 11 may also be configured with a non-PD charging communication protocol, such as a communication protocol for transmission of a communication signal through a data pin. In this case, the charging module 11 directly negotiates, through the data pin, non-PD charging with a to-be-charged device, without conversion through the first PD transceiving module 12. In some implementations, in a case that the data pins include the D+ pin and D− pin, the charging module 11 may be configured with a preset communication protocol, and a communication signal in the preset communication protocol is transmitted through the D+ pin and D− pin, and a charging parameter of Data Plus (DP) and Data Minus (DM) fast charging may be determined through negotiation of the communication signal in the preset communication protocol, so as to implement the DP and DM fast charging standardly equipped for the charging device against a to-be-charged device. Definitely, in some implementations, a general protocol may also be configured in the charging module 11, and the communication signal in the general protocol may also be transmitted through the D+ pin and the D− pin. The communication signal in the general protocol transmitted through the D+ pin and the D− pin can implement the DP and DM charging non-standardly equipped for the charging device against a to-be-charged device, in a principle that is the same as a process of the DP and DM charging in the prior art, which will not be repeated herein again.

In this implementation, a communication signal of non-PD charging is the differential mode signal transmitted through the data pin. This way, communication signals transmitted through the data pin may be subtracted, to eliminate a common mode signal and then obtain a differential mode signal; or communication signals transmitted through the data pin are added, to eliminate a differential mode signal and then obtain a common mode signal.

In application, the differential mode signal and the common mode signal transmitted through the data pin have different code rates. In some implementations, in a case that the data pins are the D+ pin and D− pin, a code rate for transmitting a differential mode signal through the data pins may be 12 MHz (megahertz) or 480 MHz, and then a code rate for transmitting a common mode signal through the D+ pin and D− pin is not equal to 12 MHz or 480 MHz.

In addition, when a Type-C port of a data cable connected to the charger or a to-be-charged device obtains communication signals transmitted through the data pin, the communication signals are added, to obtain a common mode signal, and then a PD signal is obtained based on the common mode signal.

In addition, after the Type-C port of the data cable connected to the charger or a to-be-charged device may also convert the PD signal transmitted to the charger into the common mode signal, and then the common mode signal is transmitted to the first PD transceiving module 12 through the data pin, and the first PD transceiving module 12 obtains the communication signals transmitted through the data pin and performs addition, to obtain the common mode signal corresponding to the PD signal. Therefore, PD communication between the charger and the to-be-charged device can be implemented. In addition, a PD charging parameter of the to-be-charged device is determined according to PD communication content, and then PD charging can be implemented.

In some implementations, the first data cable may be a data cable matched with the charger 1, and the second data cable may be a data cable unmatched with the charger 2. In some implementations, the first data cable may be the data cable 2 shown in FIG. 1 and FIG. 3, and the data cable 2 includes: a second Type-A port 20 and a Type-C port 22. The second Type-A port 20 and Type-C port 22 are connected by a cable 23. The second Type-A port 20 and the Type-C port 22 each include a CC pin and a data pin, and CC pins and data pins in the second Type-A port 20 and the Type-C port 22 are connected in a one-to-one correspondence.

The data cable 2 is provided with a second PD transceiving module 21. A first end of the second PD transceiving module 21 is connected to the CC pin, and a second end of the second PD transceiving module 21 is connected to the data pin.

In a case that the data cable 2 is connected to a charger 1, if the charger 1 is a first charger and the second PD transceiving module 21 is in a working state, the second PD transceiving module 21 is configured to perform mutual conversion on a common mode signal transmitted through the data pin and a PD charging signal transmitted through the CC pin, so as to perform PD charging on a to-be-charged device. In some implementations, the data cable 2 and the first charger perform, based on a differential signal transmitted through the data pin, non-PD charging on a to-be-charged device.

In a case that the data cable 2 is connected to a charger 1, if the charger 1 is a second charger and the second PD transceiving module 21 is in a non-working state, the data cable 2 and the second charger perform non-PD charging on the to-be-charged device based on the differential signal transmitted through the data pin.

When the second PD transceiving module 21 receives a second signal transmitted through the data pin, the charger 1 is the first charger. When the second PD transceiving module 21 does not receive the second signal transmitted through the data pin, the charger 1 is the second charger, and the data cable 2 generates a first signal when connected to the to-be-charged device, and the first charger generates the second signal in response to the first signal.

The first charger may be the charger 1 shown in FIG. 1 and FIG. 2.

In this implementation, the second PD transceiving module 21 has a same structure as the first PD transceiving module 12, but a difference is that: the first end of the first PD transceiving module 12 is connected to the charging module 11, while the first end of the second PD transceiving module 21 is connected to the CC pin, so that the second PD transceiving module 21 is configured to implement mutual conversion between the PD signal transmitted through the CC pin and the common mode signal transmitted through the data pin.

This way, without making any change to a structure of the to-be-charged device, the charger and the Type-A to Type-C data cable provided by the embodiment of this application can perform PD charging on the to-be-charged device that supports the PD charging.

In some implementations, when the second PD transceiving module 21 determines, based on an electric signal transmitted through the CC pin, that the data cable 2 generates a first signal when inserted into the to-be-charged device, and the first signal is transmitted to the first PD transceiving module 12 through the data pin.

In the first PD transceiving module 12, a first end of the first PD transceiving module 12 is in communication with a second end of the first PD transceiving module 12 in response to the first signal, and a second signal is generated. The second signal is transmitted to the second PD transceiving module 21 through the data pin, and in the second PD transceiving module 21, a first end of the second PD transceiving module 21 is in communication with a second end of the second PD transceiving module 21 in response to the second signal.

That the data cable 2 is inserted into the to-be-charged device may be that the Type-C port of the data cable 2 is inserted into a Type-C port of the to-be-charged device that supports the PD charging.

In some implementations, the second PD controller is configured to generate the first signal when a first preset electric signal is detected on a CC pin by a second common mode input amplifier, and transmit the first signal to the positive data pin and the negative data pin through a second waveform adjustment circuit and a second common mode output amplifier. When the data cable is connected to a to-be-charged device that supports the PD charging, and the CC pin is grounded through a first resistor in the to-be-charged device that supports the PD charging, the CC pin has the first preset electric signal.

The first preset electric signal may be a voltage range. For example, in case that a detected voltage value of the CC pin is less than 3 volt (V), it is determined that a data cable is connected to the to-be-charged device that supports the PD charging, so that the charger 1 may be triggered to enable the PD charging; and in a case that a detected voltage value of the CC pin is greater than or equal to 3V, it is determined that a data cable is connected to a to-be-charged device that does not support the PD charging, so that the charger 1 may be triggered to enable the non-PD charging. It should be noted that the voltage value of the first preset electric signal being less than 3V is just an example. In some implementations, a voltage value on CC wiring and a resistance value of the first resistor may be used for determining, which is not specifically limited herein.

It should be noted that, in actual application, if the to-be-charged device that supports the PD charging has a pull-down resistor (that is, the first resistor) connected to the CC pin, the second PD transceiving module 21 may send the first signal to the first PD transceiving module 12 through the data pin when determining that the CC pin is pulled down by the pull-down resistor based on an electric signal value on the CC pin. When the first PD transceiving module 12 receives the first signal, it is determined that the charger 1 is connected, through the data cable, to the to-be-charged device that supports the PD charging, and sends, in response to the first signal, a second signal to the second PD transceiving module 21 through the data pin, so as to trigger, through the second signal, PD charging negotiation with the to-be-charged device. In some implementations, the second signal may be a Start Of Packet (SOP) command of an output module.

In addition, the second charger may be a charger that does not match the data cable 2, specifically a charger that does not support the PD charging, a charger that does not have the first PD transceiving module 12, or the like. When the data cable 2 is connected to the second charger, the second charger will not transmit the second signal through the data pin in response to the first signal. In this case, the CC pin on the data cable 2 may be connected to a VBUS pin through the pull-up resistor, and a structure of the CC pin connected to the VBUS pin through the pull-up resistor is the same as a structure of a CC pin in the Type-C port in the prior art and has the same function, which will not be repeated herein.

Figure 4:
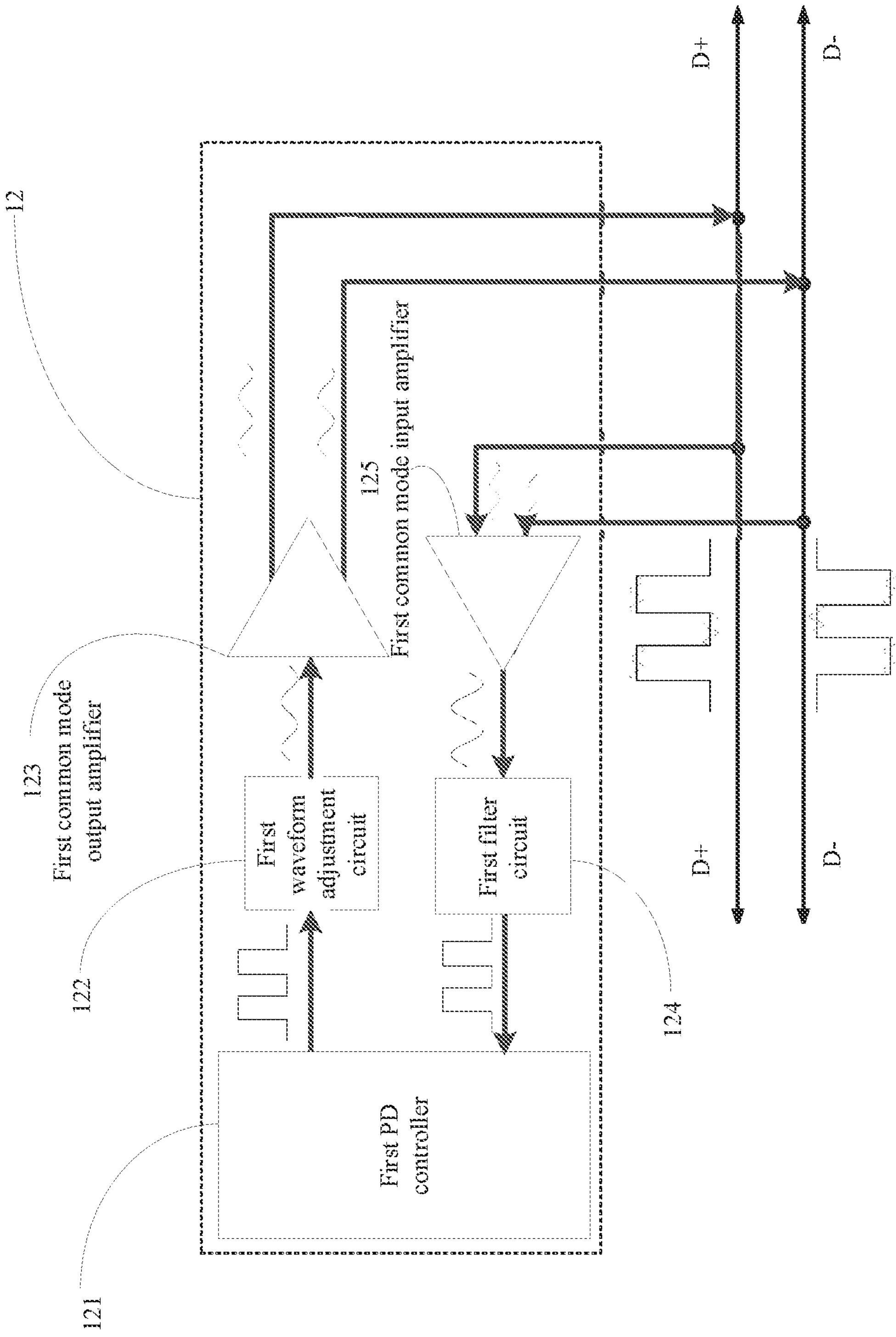
FIG. 4 is a circuit diagram of a PD transceiving module in the charging device according to an embodiment of this application.

In some implementations, as shown in FIG. 4, data pins include a positive data pin (D+ pin as shown in FIG. 4) and a negative data pin (D− pin as shown in FIG. 4). A first PD transceiving module 12 includes a first PD controller 121, a first waveform adjustment circuit 122, a first common mode output amplifier 123, a first filter circuit 124, and a first common mode input amplifier 125.

A first end of the first PD controller 121 is connected to a second end of a charging module 11, and a second end of the first PD controller 121 is connected to a first end of the first waveform adjustment circuit 122, a second end of the first waveform adjustment circuit 122 is connected to a first end of the first common mode output amplifier 123, a second end of the first common mode output amplifier 123 is connected to the D+ pin, and a third end of the first common mode output amplifier 123 is connected to the D− pin. A third end of the first PD controller 121 is connected to a first end of the first filter circuit 124, a second end of the first filter circuit 124 is connected to a first end of the first common mode input amplifier 125, a second end of the first common mode input amplifier 125 is connected to the D+ pin, and a third end of the first common mode input amplifier 125 is connected to the D− pin.

The first waveform adjustment circuit 122 is configured to convert a square wave signal transmitted by the first PD controller 121 into a sine wave signal and reduce an amplitude of the sine wave signal. The first common mode output amplifier 123 is configured to convert a reduced sine wave signal into a common mode signal, and perform common mode transmission through the D+ pin and the D− pin.

The first common mode input amplifier 125 is configured to amplify the common mode signal transmitted through the D+ pin and the D− pin, and the first filter circuit 124 is configured to perform filtering on an amplified common mode signal, convert a filtered and amplified common mode signal into the square wave signal and then transmit the square wave signal to the first PD controller 121.

In some implementations, the first filter circuit 124 and the first common mode input amplifier 125 are further configured to obtain the first signal transmitted through the D+ pin and the D− pin, and transmit the first signal to the first PD controller 121. The first PD controller 121 is further configured to inform a control unit in the charging module 11 of the first signal, to respond to the first signal and generate a second signal. The second signal is transmitted to the D+ pin and the D− pin through the first PD controller 121, the first waveform adjustment circuit 122, and the first common mode output amplifier 123, and is obtained by a second PD transceiving module 21 in the data cable 2.

In addition, a PD signal output by the first PD controller 121 is a square wave signal, the square wave signal is adjusted to a sine wave signal by the first waveform adjustment circuit 122, and then the sine wave signal is adjusted to a common mode signal by the first common mode output amplifier 123, so that the common mode signal is transmitted in common mode through the D+ pin and the D− pin. In some implementations, the common mode signal may be two same small sine signals.

In this implementation, the common mode signal transmitted through the D+ pin and the D− pin is obtained by the first filter circuit 124 and the first common mode input amplifier 125, and after the common mode signal is processed, the common mode signal is converted into a PD square wave signal and then transmitted to the first PD controller 121, so as to provide a recognizable PD signal to the charging module 11 through the first PD controller 121. In addition, the PD signal transmitted by the charging module 11 is modulated by the first PD controller 121, and processed by the first waveform adjustment circuit 122 and the first common mode output amplifier 123, and then a common mode signal which can be transmitted through the D+ pin and the D− pin is formed, and the common mode signal is transmitted to the to-be-charged device through the D+ pin and the D− pin, thereby implementing PD charging between the charger and the to-be-charged device.

In some implementations, as shown in FIG. 4, the first PD controller 121 is configured to generate a PD charging signal when a value of a first electric signal on a positive data pin (D+ pin as shown in FIG. 4) and a negative data pin (D− pin as shown in FIG. 4) detected by the first common mode input amplifier 125 is less than a preset value, and configured to transmit the PD charging signal to the positive data pin and the negative data pin through the first waveform adjustment circuit 122 and the first common mode output amplifier 123, so as to perform PD charging on the to-be-charged device. The preset value does not overlap a value of a second electric signal on the D+ pin and the D− pin during transmission of a non-PD charging signal.

In some implementations, the value of the first electric signal may be a voltage value of a communication signal transmitted through the D+ pin and the D− pin, and the preset value may be 500 mV.

In some implementations, the preset value may be greater than a high threshold VHSOH of a High-Speed (HS) signal of USB 2.0 and less than a high threshold VOH of a Low-Speed (LS) signal.

In this implementation, the first PD controller 121 may transmit a PD communication signal at a time other than a transmission time for transmitting a non-PD charging signal through the D+ pin and the D− pin, so that mutual interference between the PD communication signal and the non-PD charging signal can be prevented.

In some implementations, the first common mode input amplifier 125 is configured to amplify a first communication signal transmitted through the positive data pin (the D+ pin as shown in FIG. 4) and a second communication signal transmitted through the negative data pin (the D− pin as shown in FIG. 4), and obtain a common mode signal based on the first communication signal and the second communication signal.

In some implementations, the first communication signal and the second communication signal may be common mode signals output by the second PD transceiving module 21 in the data cable 2 connected to the charger 1. In some implementations, the second PD transceiving module 21 can convert a PD charging signal transmitted by a to-be-charged device through the CC pin into the first communication signal and the second communication signal, and transmit the first communication signal through the D+ pin and the second communication pin through the D− pin. This way, the first common mode input amplifier 125 may receive the first communication signal through the D+ pin and the second communication signal through the D− pin.

In addition, the first common mode input amplifier 125 may include an adding circuit, and that the common mode signals are obtained based on the first communication signal and the second communication signal may be understood as that one signal is obtained from common mode signals by adding the first communication signal and the second communication signal.

In this implementation, the first common mode input amplifier 125 converts two signals transmitted in common mode through the D+ pin and the D− pin into one signal, to facilitate mediation by the first PD controller.

In some implementations, the first common mode output amplifier 123 is configured to split a sine wave signal processed by the first waveform adjustment circuit 122 into a third communication signal and a fourth communication signal, and the third communication signal and the fourth communication signal are common mode signals.

In some implementations, the third communication signal and the fourth communication signal may be same sine signals, and the same sine signals are transmitted in common mode on the D+ pin and the D− pin.

In this implementation, first, a square wave signal output by the first PD controller 121 is adjusted by the first waveform adjustment circuit 122 into the sine wave signal, and then the sine wave signal is split into common mode signals by the first common mode output amplifier 123, so as to facilitate common mode transmission through the D+ pin and the D− pin.

It should be noted that a PD transceiving module is also disposed in a data cable connected to the charger 1 or in the to-be-charged device connected to the data cable, and the PD transceiving module is connected to the D+ pin, the D− pin, and the CC pin. Therefore, when the third communication signal and the fourth communication signal transmitted in common mode is received through the D+ pin and the D− pin, the communication signals are added, to keep a common mode signal (that is, a PD charging signal), and then the common mode signal is transmitted to the PD charging module in the to-be-charged device through the CC pin, to implement the PD charging.

In some implementations, in a case that the charger 1 is connected to the first data cable, if a priority of the non-PD charging is greater than a priority of the PD charging, the non-PD charging is performed on the to-be-charged device; and if the non-PD charging fails, the PD charging is performed on the to-be-charged device.

In a case that the charger 1 is connected to the first data cable, if the priority of the PD charging is greater than the priority of the non-PD charging, the PD charging is performed on the to-be-charged device; and if the PD charging fails, the non-PD charging is performed on the to-be-charged device.

In some implementations, the non-PD charging may be a charging mode based on a preset communication protocol, and a communication signal in the preset protocol may be transmitted through a data pin.

In some implementations, the preset communication protocol is also pre-configured in a to-be-charged device standardly equipped for the charger 1, so that a charging parameter may be negotiated based on the preset communication protocol, and the standardly equipped to-be-charged device may be charged based on a standard and according to the charging parameter determined through negotiation.

In addition, when the charging device shown in FIG. 1 is connected to a non-standardly equipped to-be-charged device, the non-standardly equipped to-be-charged device is not configured with the preset communication protocol, so only PD communication may be implemented.

In some implementations, as shown in FIG. 1, the charging device may also be connected to a to-be-charged device that is not standardly equipped and does not support the PD charging. In this case, a charging parameter may be negotiated according to a general charging protocol (for example, a general communication protocol for a communication signal that can be transmitted on the D+ pin and the D− pin), and the non-standardly equipped to-be-charged device is charged according to the charging parameter determined through negotiation, or the to-be-charged device is charged directly according to a default charging parameter.

In this implementation, a priority of the PD charging and a priority of the non-PD charging are set in advance, so that a charging protocol with a high priority may be used for charging the to-be-charged device.

In some implementations, the data pins include a positive data pin and a negative data pin, and the second PD transceiving module 21 includes a second PD controller, a second waveform adjustment circuit, a second common mode output amplifier, a second filter circuit, and a second common mode input amplifier.

A first end of the second PD controller is connected to the CC pin, a second end of the second PD controller is connected to a first end of the second waveform adjustment circuit, a second end of the second waveform adjustment circuit is connected to a first end of the second common mode output amplifier, a second end of the second common mode output amplifier is connected to the positive data pin, and a third end of the second common mode output amplifier is connected to the negative data pin. A third end of the second PD controller is connected to a first end of the second filter circuit, a second end of the second filter circuit is connected to a first end of the second common mode input amplifier, a second end of the second common mode input amplifier is connected to the positive data pin, and a third end of the second common mode input amplifier is connected to the negative data pin.

The second PD controller is configured to obtain a square wave signal transmitted through the CC pin. The second waveform adjustment circuit is configured to convert the square wave signal obtained by the second PD controller into a sine wave signal and reduce an amplitude of the sine wave signal. The second common mode output amplifier is configured to convert a reduced sine wave signal into common mode signals and perform common mode transmission through the positive data pin and the negative data pin.

The second common mode input amplifier is configured to amplify the common mode signals transmitted through the positive data pin and the negative data pin. The second filter circuit is configured to perform filtering on the amplified common mode signal, convert a filtered and amplified common mode signal into a square wave signal, and then transmit the square wave signal to the second PD controller, for transmission to the to-be-charged device through the CC pin.

It should be noted that the second PD transceiving module 21 in the data cable 2 may have a same structure and a same working principle as the first PD transceiving module 12 in FIG. 4, but a difference is that: the first end of the first PD transceiving module 12 is connected to the charging module 11, while the first end of the second PD transceiving module 21 is connected to the CC pin, so that the second PD transceiving module 21 is configured to implement mutual conversion between the PD signal transmitted through the CC pin and the common mode signal transmitted through the data pin. A working principle of the second PD transceiving module 21 will not be further described herein.

In some implementations, the second common mode input amplifier is configured to obtain a third communication signal transmitted through the positive data pin and a fourth communication signal transmitted through the negative data pin, and obtain a common mode signal based on the third communication signal and the fourth communication signal.

In some implementations, the third communication signal and the fourth communication signal may be common mode signals output by the first PD transceiving module 12 in the charger 1 connected to the data cable 2. In some implementations, the first PD transceiving module 12 can convert a PD charging signal output by a charging module into the third communication signal and the fourth communication signal, and transmit the third communication signal on the D+ pin and the fourth communication pin on the D− pin. This way, the second common mode input amplifier can receive the third communication signal through the D+ pin and the fourth communication signal through the D− pin.

For a structure and working principle of the second common mode input amplifier, please refer to the structure and working principle of the first common mode input amplifier, and the second common mode input amplifier can play a same role as the first common mode input amplifier, which will not be described herein again.

In some implementations, the second common mode output amplifier is configured to split the sine wave signal processed by the second waveform adjustment circuit into a first communication signal and a second communication signal, where the first communication signal and the second communication signal are common mode signals.

For a working principle of the second common mode output amplifier, please refer to the working principle of the first common mode output amplifier. In addition, the second common mode output amplifier can play a same role as the first common mode output amplifier, which will not be described herein again.

It can be understood that the embodiments described in the present disclosure may be implemented by hardware, software, firmware, middleware, microcode, or a combination thereof. For implementation with hardware, the module, unit, submodule, subunit, and the like may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions of this application, or a combination thereof.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the electronic device in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The invention claimed is:

1. A charger, comprising:

a first Type-A port;

a charging module; and a first Power Delivery (PD) transceiving module, wherein the first Type-A port comprises a data pin, a first end of the charging module is connected to the data pin, a second end of the charging module is connected to a first end of the first PD transceiving module, and a second end of the first PD transceiving module is connected to the data pin, wherein in a case that the charger is connected to a data cable, when the data cable is a first data cable and the first PD transceiving module is in a working state, the charging module performs non-PD charging on a to-be-charged device based on a differential mode signal transmitted through the data pin, or the charging module performs PD charging on a to-be-charged device based on a common mode signal processed by the first PD transceiving module and transmitted through the data pin, wherein in a case that the charger is connected to the data cable, when the data cable is a second data cable, the first PD transceiving module is in a non-working state, the charging module performs non-PD charging on a to-be-charged device based on a differential mode signal transmitted through the data pin, wherein when the first PD transceiving module receives a first signal transmitted through the data pin, the data cable is the first data cable, and when the first PD transceiving module does not receive the first signal transmitted through the data pin, the data cable is the second data cable, and wherein the first data cable generates the first signal when connected to the to-be-charged device.

2. The charger according to claim 1, wherein the first PD transceiving module comprises:

a first PD controller;

a first waveform adjustment circuit;

a first common mode output amplifier;

a first filter circuit; and a first common mode input amplifier, wherein the first PD controller is connected to the charging module, the first waveform adjustment circuit, and the first filter circuit, wherein the first waveform adjustment circuit is also connected to the data pin through the first common mode output amplifier, wherein the first filter circuit is also connected to the data pin through the first common mode input amplifier, wherein the first waveform adjustment circuit is configured to convert a square wave signal transmitted by the first PD controller into a sine wave signal and reduce an amplitude of the sine wave signal, wherein the first common mode output amplifier is configured to convert a reduced sine wave signal into a common mode signal and perform common mode transmission through the data pin, wherein the first common mode input amplifier is configured to amplify the common mode signal transmitted through the data pin, and wherein the first filter circuit is configured to perform filtering on an amplified common mode signal, convert a filtered and amplified common mode signal into a square wave signal, and transmit the square wave signal to the first PD controller.

3. The charger according to claim 2, wherein the first PD controller is configured to generate a PD charging signal in a case that a value of a first electric signal on the data pin detected by the first common mode input amplifier is less than a preset value, and transmit the PD charging signal to the data pin through the first waveform adjustment circuit and the first common mode output amplifier, so as to perform PD charging on a to-be-charged device, and wherein the preset value does not overlap a value of a second electric signal on the data pin when transmitting a non-PD charging signal.

4. The charger according to claim 2, wherein the data pin comprises a positive data pin and a negative data pin, the first common mode input amplifier is configured to amplify a first communication signal transmitted through the positive data pin and a second communication signal transmitted through the negative data pin, and add the first communication signal and the second communication signal to obtain a common mode signal.

5. The charger according to claim 2, wherein the first common mode output amplifier is configured to split a sine wave signal processed by the first waveform adjustment circuit into a third communication signal and a fourth communication signal, and the third communication signal and the fourth communication signal are common mode signals.

6. The charger according to claim 1, wherein in a case that the charger is connected to the first data cable, when a priority of the non-PD charging is greater than a priority of the PD charging, the non-PD charging is performed on the to-be-charged device; and when the non-PD charging fails, the PD charging is performed on the to-be-charged device, and wherein in a case that the charger is connected to the first data cable, when the priority of the PD charging is greater than the priority of the non-PD charging, the PD charging is performed on the to-be-charged device; and when the PD charging fails, the non-PD charging is performed on the to-be-charged device.

7. A data cable, comprising:

a second Type-A port; and a Type-C port, wherein the second Type-A port and the Type-C port are connected by a cable, the second Type-A port and the Type-C port each comprise a Configuration Channel (CC) pin and a data pin, and CC pins and data pins in the second Type-A port and the Type-C port are connected in a one-to-one correspondence, wherein the data cable is provided with a second Power Delivery (PD) transceiving module, wherein a first end of the second PD transceiving module is connected to the CC pin, and a second end of the second PD transceiving module is connected to the data pin, wherein in a case that the data cable is connected to a charger, when the charger is a first charger and the second PD transceiving module is in a working state, the second PD transceiving module is configured to perform mutual conversion on a common mode signal transmitted through the data pin and a PD charging signal transmitted through the CC pin, so as to perform PD charging on a to-be-charged device, or the data cable and the first charger perform non-PD charging on the to-be-charged device based on a differential signal transmitted through the data pin, wherein in a case that the data cable is connected to a charger, when the charger is a second charger and the second PD transceiving module is in a non-working state, the data cable and the second charger perform non-PD charging on a to-be-charged device based on a differential signal transmitted through the data pin, and wherein when the second PD transceiving module receives a second signal transmitted through the data pin, the charger is the first charger; and when the second PD transceiving module does not receive the second signal transmitted through the data pin, the charger is the second charger, and the data cable generates a first signal when connected to the to-be-charged device, and the first charger generates the second signal in response to the first signal.

8. The data cable according to claim 7, wherein the second PD transceiving module comprises:

a second PD controller;

a second waveform adjustment circuit; a second common mode output amplifier;

a second filter circuit; and a second common mode input amplifier, wherein the second PD controller, the CC pin, the second waveform adjustment circuit, and the second filter circuit are connected to the data pin, and the second filter circuit is connected to the data pin through the second common mode input amplifier, wherein the second PD controller is configured to obtain a square wave signal transmitted through the CC pin, the second waveform adjustment circuit is configured to convert the square wave signal obtained by the second PD controller into a sine wave signal and reduce an amplitude of the sine wave signal, and the second common mode output amplifier is configured to convert a reduced sine wave signal into a common mode signal and perform common mode transmission through the data pin, and wherein the second common mode input amplifier is configured to amplify the common mode signal transmitted through the data pin, and the second filter circuit is configured to perform filtering on an amplified common mode signal, convert a filtered and amplified common mode signal, into a square wave signal and transmit the square wave signal to the second PD controller, so as to transmit the square wave signal to the to-be-charged device through the CC pin.

9. The data cable according to claim 8, wherein the second PD controller is configured to generate the first signal when a first preset electric signal is detected on the CC pin by the second common mode input amplifier, and transmit the first signal to the data pin through the second waveform adjustment circuit and the second common mode output amplifier, wherein when the data cable is connected to a to-be-charged device that supports the PD charging, and the CC pin is grounded through a first resistor in the to-be-charged device that supports the PD charging, the CC pin has the first preset electric signal.

10. The data cable according to claim 8, wherein the data pin comprises a positive data pin and a negative data pin, and the second common mode input amplifier is configured to obtain a third communication signal transmitted through the positive data pin and a fourth communication signal transmitted through the negative data pin, and add the third communication signal and the fourth communication signal to obtain a common mode signal.

11. The data cable according to claim 8, wherein the second common mode output amplifier is configured to split a sine wave signal processed by the second waveform adjustment circuit into a first communication signal and a second communication signal, wherein the first communication signal and the second communication signal are common mode signals.

12. A charging device, comprising:

a charger, comprising:

a first Type-A port;

a charging module; and a first Power Delivery (PD) transceiving module, wherein the first Type-A port comprises a data pin, a first end of the charging module is connected to the data pin, a second end of the charging module is connected to a first end of the first PD transceiving module, and a second end of the first PD transceiving module is connected to the data pin;

a data cable, comprising:

a second Type-A port; and a Type-C port, wherein the second Type-A port and the Type-C port are connected by a cable, the second Type-A port and the Type-C port each comprise a Configuration Channel (CC) pin and a data pin, and CC pins and data pins in the second Type-A port and the Type-C port are connected in a one-to-one correspondence, wherein the data cable is provided with a second PD transceiving module, wherein a first end of the second PD transceiving module is connected to the CC pin, and a second end of the second PD transceiving module is connected to the data pin; and a data pin in a first Type-A port is correspondingly connected to a data pin in a second Type-A port, wherein in a case that the charger is connected to the data cable, when the data cable is a first data cable and the first PD transceiving module is in a working state, the charging module performs non-PD charging on a to-be-charged device based on a differential mode signal transmitted through the data pin, or the charging module performs PD charging on a to-be-charged device based on a common mode signal processed by the first PD transceiving module and transmitted through the data pin, wherein in a case that the charger is connected to the data cable, when the data cable is a second data cable, the first PD transceiving module is in a non-working state, the charging module performs non-PD charging on the to-be-charged device based on a differential mode signal transmitted through the data pin, wherein when the first PD transceiving module receives a first signal transmitted through the data pin, the data cable is the first data cable, and when the first PD transceiving module does not receive the first signal transmitted through the data pin, the data cable is the second data cable, and wherein the first data cable generates the first signal when connected to the to-be-charged device, wherein in a case that the data cable is connected to the charger, when the charger is a first charger and the second PD transceiving module is in a working state, the second PD transceiving module is configured to perform mutual conversion on a common mode signal transmitted through the data pin and a PD charging signal transmitted through the CC pin, so as to perform PD charging on the to-be-charged device, or the data cable and the first charger perform non-PD charging on the to-be-charged device based on a differential signal transmitted through the data pin, wherein in a case that the data cable is connected to the charger, when the charger is a second charger and the second PD transceiving module is in the non-working state, the data cable and the second charger perform non-PD charging on the to-be-charged device based on a differential signal transmitted through the data pin, and wherein when the second PD transceiving module receives a second signal transmitted through the data pin, the charger is the first charger; and when the second PD transceiving module does not receive the second signal transmitted through the data pin, the charger is the second charger, and the data cable generates the first signal when connected to the to-be-charged device, and the first charger generates the second signal in response to the first signal.

13. The charging device according to claim 12, wherein a second PD transceiving module generates a first signal when it is determined, based on an electric signal transmitted through a CC pin, that the data cable is inserted into a to-be-charged device, and the first signal is transmitted to a first PD transceiving module through a data pin, and wherein in the first PD transceiving module, a first end of the first PD transceiving module is in communication with a second end of the first PD transceiving module in response to the first signal, and a second signal is generated, the second signal is transmitted to the second PD transceiving module through a data pin, and in the second PD transceiving module, a first end of the second PD transceiving module is in communication with a second end of the second PD transceiving module in response to the second signal.

* * * * *